United States Patent Office 3,214,332
Patented Oct. 26, 1965

3,214,332
METHOD FOR CONTROLLING NEMATODES WITH NICKEL SALTS
Carroll A. Hochwalt, Jr., Upper Montclair, N.J., assignor to The International Nickel Company, Inc., New York, N.Y., a corporation of Delaware
No Drawing. Filed May 25, 1964, Ser. No. 370,104
6 Claims. (Cl. 167—14)

The present invention is directed to the treatment of soil or growth media and, in particular, to a method for the control of nematodes which attack plants.

It has become recognized in the agricultural field that nematodes are responsible for extensive damage to plants, including plants grown for food, for fiber, and ornamental plants. Nematodes damage the root structure of plants and interfere with proper development thereof such that the ability of the plants growing in infested soil to flourish is greatly limited, the weakened plant becomes subject to attack by other diseasing agents, and in severe cases the plant is killed. Nematode attack may occur in roots, stems, leaves and buds in plants depending upon the type of nematode. Bulbs and seeds may also be attacked. In any of these events, an economic loss results, which loss can be and in many instances is, large. The problem of controlling nematodes is a complicated one which is encountered all over the world. It is, of course, necessary that any treatment of the soil to destroy or inhibit the growth of plant attacking nematodes must not itself result in inhibiting the desired vigorous plant growth.

Many solutions for the problem of controlling nematodes have been proposed but none of the proposals to date has been entirely successful. A present commercial practice which has been adopted for control of soil-dwelling nematodes involves the use of halogenated hydrocarbons. These compounds are volatile and must be injected into the soil prior to planting of the crop and must be covered so as to prevent dissipation of the toxicant before it is able to exert the desired effect in controlling nematodes. Special methods of application are required so as to prevent loss of the active toxicant ingredients from the soil before they have exerted the nematocidal effect. A high cost is accordingly associated with the use of present nematocides and this factor militates against the use thereof except in relation to the treatment of soil intended for growing crops having a high market value, e.g., on the order of $300.00 to $500.00 or more per acre. Accordingly, crops of lower value are not, as practical matter, protected against the destructive results of nematode infestation. In view of the foregoing factors, a strong demand exists for an effective nematocide which can be employed at lower cost.

It has now been discovered that certain nickel compounds introduced into the soil provided effective control of nematodes without exhibiting an undue phytotoxic effect.

It is an object of the present invention to provide an improved method for treating nematode-infested soil to control the nematodes.

It is a further object of the invention to provide a method for nematode control which does not produce undue phytotoxic effects and which does not deleteriously affect the soil.

Other objects and advantages of the invention will become apparent from the following description.

Broadly stated, the invention comprises a method for the control of nematodes which comprises introducing into nematode-infested soil a nematocidal amount of a nickel compound from the group consisting of nickel sulfate, nickel borate, nickel cyanide, nickel phosphate, and nickel nitrate. The nickel compounds contemplated in accordance with the invention exhibit nematocidal activity in amounts as low as about 0.05 part per million (p.p.m.). Nickel concentrations of the order of at least 0.1 or 1 or 5 p.p.m. are employed, and in most instances it is unnecessary to employ more than about 20 p.p.m. of nickel, although higher concentrations can be used. The nickel compounds conveniently may be introduced into the soil as a water solution which may be injected into the soil by means of a soil chisel or the like. Even more advantageously, the nickel compounds may be sprayed as a water solution or dusted directly on the soil surface prior to plowing and may then be turned into the soil when the field is plowed preparatory to planting. For reasons of cost, the compounds may be employed in the form of hydrated salts, e.g., nickel sulfate hexahydrate, nickel cyanide tetrahydrate, nickel phosphate monohydrate and/or nickel nitrate hexahydrate.

In order to give those skilled in the art a better understanding of the invention and a better appreciation of the advantages of the invention, the following illustrative examples are given:

EXAMPLE I

The nematocidal activity of nickel borate, nickel nitrate, nickel cyanide, nickel phosphate, and nickel sulfate, respectively, was determined against a species of Panagrellus, a active saprozoic nematode, in an aqueous medium. The nematodes were grown in a culture medium, were separated therefrom by means of the Baermann funnel technique to insure freedom from food contamination and uniformity of age and were transferred to stoppered test tubes containing 10 milliliters of the chemical dosage to be tested. In each case, the nematode population was adjusted to 50 to 75 at the time of seeding. In each case, the tests were run in duplicate and duplicate check or blank tests were conducted simultaneously in tap water. Under the conditions of test, the nematodes survive at least seven days without the addition of food. The nematodes were observed by microscope over a period of seven days to establish the rapidity of kill and the final end point of kill. Panagrellus are characterized by constant and active movement permitting easy identification of live and dead individuals. Furthermore, the species reproduces rapidly by parthenogenesis and the testing technique permits observation of the nematocides on reproductive behavior and also upon individuals of various ages. The aforementioned nickel compounds were tested at concentrations of 50 and 5 p.p.m. by weight of the compound tested. In addition, a nine day test was conducted with nickel sulfate hexahydrate at concentrations of 10, 1 and 0.1 p.p.m. by weight. Results of the observations are provided in the following Tables I and II:

*Table I*

| Chemical | Dose, p.p.m. nickel | Percent Kill | | |
|---|---|---|---|---|
| | | 2 Days | 4 Days | 7 Days |
| Nickel borate Ni(BO$_2$)$_2$ | 50 | 70 | 100 | 100 |
| | 5 | 40 | 90 | 100 |
| Nickel nitrate hexahydrate | 50 | 99 | 100 | 100 |
| | 5 | 45 | 85 | 92 |
| Nickel cyanide tetrahydrate | 50 | 32 | 100 | 100 |
| | 5 | 10 | 80 | 95 |
| Nickel phosphate monohydrate | 50 | 100 | 100 | 100 |
| | 5 | 82 | 99 | 100 |
| Nickel sulfate hexahydrate | 50 | 100 | 100 | 100 |
| | 5 | 82 | 99 | 100 |
| Untreated check | | 2 | 10 | 20 |

Table II

| Chemical | Dose, p.p.m. nickel | Percent Kill | | | | | |
|---|---|---|---|---|---|---|---|
| | | 1 Day | 2 Days | 3 Days | 5 Days | 7 Days | 9 Days |
| Nickel sulfate hexahydrate | 10 | 35 | 100 | 100 | 100 | 100 | 100 |
| | 1 | 0 | 45 | 50 | 55 | 80 | 95 |
| | 0.1 | 0 | 10 | 15 | 50 | 60 | 90 |
| Untreated check | | 0 | 0 | 5 | 5 | 10 | 15 |

Materials providing 100% mortality of Panagrellus at a concentration of 5 p.p.m. are considered to be active nematocides. It is considered that the 90% mortality displayed with nickel sulfate in the nine day test at a concentration of only 0.1 p.p.m. is quite significant.

EXAMPLE II

Nematode-infested soil was prepared by mixing one part by weight of soil heavily infested with root-knot nematode (*Meloidogyne hapla*) embedded in tomato root tissue with eight parts of ordinary potting soil. The resulting mixture of infested soil was then cured for two weeks to permit larval hatching of the nematode and to permit escape of all individuals from the original tomato root tissue employed in the culture preparation. During the curing process, the soil was thoroughly turned over every other day to obtain a highly uniform and homogeneous mixture of infested soil. One kilogram lots of the soil were mixed with nickel sulfate hexahydrate in amounts corresponding to 37.5, 75 and 150 pounds of the nickel compound per acre by means of tumbling. The soil mixture was retained in a closed condition for 48 hours. The treated soil was then placed in pots and stored for an additional five days. At the end of this period, half of the pots was planted with tomato seedlings and the other half of the pots was planted to beet seed. Check pots of infested soil which did not contain the nickel compound and additional check pots which had been treated with equivalent weight percentages of commercial nematocides (1,2-dibromo 3-chloropropane and a mixture of 1,3-dichloropropene and 1,2-dichloropropane) were also prepared in an identical manner.

The plants were observed over a period of four to six weeks. At the end of this time, it was seen that the plants growing in untreated soil were very seriously damaged as a result of nematode invasion. Examination of the plants when removed from the pots revealed that practically no root system was present. On the other hand, the plants growing in soil treated with the nickel sulfate exhibited vigorous growth with little evidence of phytotoxicity attributable to the compound. Examination of the roots of the plants for nematode invasion further demonstrated that the plants had been protected from nematode invasion to a superior extent as compared to the plant growing in soil treated with either of the commercial nematocides.

EXAMPLE III

A field trial in a slightly acid Kansas sandy silt loam river bed cumulation soil known to be heavily infested with root knot nematodes from year to year was conducted using nickel sulfate hexahydrate, nickel nitrate hexahydrate, and the two commercial nematocides discussed in Example II. Each nickel compound was tested at 150, 75 and 37.5 pounds of the nickel compound per acre and the commercial nematocides were tested in equivalent concentrations as indicated in Table III hereafter. All plots were in duplictae and all rows were a minimum of 500 feet in length. Two days prior to soil treatment, about one and one-half inches of water was supplied by overhead irrigation to bring the soil moisture content up to a suitable level. The commercial nematocides were applied as recommended by the manufacturer and the nickel salts were made up as a water solution.

In each case, the materials were injected continuously into the soil to a depth of six inches by means of a soil chisel. A packing wheel provided immediately behind the chisel injector effectively covered and lightly packed the soil immediately after injection. One week after the soil treatment (in late April), the soil was planted to cucumber, turnip and beet. Soil temperature was about 70° F. at the time of treatment and also at the time of planting the index crop. Further plots were planted to okra at a later time than the plantings of beet, cucumber and turnip. Irrigation of the area was required from time to time during the growing season since the growing season involved was dry. Crops in each case were observed for seedling emergence and for growth of the emergent plants over a period of months. It was observed that a heavy infestation of root knot nematode developed in the untreated soil during the growing season. In order to check the extent of nematode invasion, 30 to 40 individual mature plants were carefully lifted from the soil. Adhering soil was carefully removed and the available root system was then carefully examined for the extent and degree of nematode galls. The infestation of individual plants was scored on a system of zero to 5 with zero indicating no root galls and 5 indicating very heavy nematode attack. A total scoring or rating of all the plants examined was accumulated and this, in turn, divided by the total maximum infection and referred to a basis of 100 as a maximum total infection rating to obtain a "root-knot index." The following Table III contains the results of the tests, including the "root-knot index" obtained:

Table III

| Crop | Chemical | Dose, pounds per acre | Percent of Plants Infected | Root-Knot Index |
|---|---|---|---|---|
| Turnips | Nickel sulfate hexahydrate | 150 | 25 | 5 |
| | | 75 | 16 | 3.3 |
| | | 37.5 | 10 | 2 |
| | Untreated check | | 85 | 42 |
| | Nickel nitrate hexahydrate | 150 | 20 | 9.3 |
| | | 75 | 18 | 2.2 |
| | | 37.5 | 6.3 | 1.2 |
| | 1,2-dibromo 3-chloropropane | 37.5 | 73 | 40 |
| | Untreated check | | 53 | 44.8 |
| Beets | Nickel sulfate hexahydrate | 150 | 15 | 10 |
| | | 75 | 8 | 5 |
| | | 37.5 | 15 | 12.2 |
| | Untreated check | | 83 | 46 |
| | Nickel nitrate hexahydrate | 150 | 43 | 21.2 |
| | | 75 | 30 | 13.3 |
| | | 37.5 | 40 | 17.6 |
| | 1,2-dibromo 3-chloropropane | 75 | 27 | 23.2 |
| | Untreated check | | 78 | 49 |
| Cucumbers | Nickel sulfate hexahydrate | 150 | 6 | 6.7 |
| | | 75 | 0 | 0 |
| | | 37.5 | 13 | 8 |
| | Untreated check | | 100 | 77.5 |
| | Nickel nitrate hexahydrate | 150 | 0 | 0 |
| | | 75 | 0 | 0 |
| | | 37.5 | 0 | 0 |
| | Untreated check | | 78 | 33 |
| | 1,2-dibromo 3-chloropropane | 150 | 67 | 16 |
| | | 75 | 67 | 17.5 |
| | | 37.5 | 53 | 24 |
| | 1,3-dichloropropene and 1,2-dichloropropane | 150 | 27 | 5.3 |
| | | 75 | 46 | 10 |
| | | 37.5 | 53 | 10.7 |
| | Untreated check | | 60 | 18.7 |
| Okra | Nickel sulfate hexahydrate | 150 | 75 | 42 |
| | | 75 | 78 | 67 |
| | | 37.5 | 92 | 43 |
| | Nickel nitrate hexahydrate | 150 | 94 | 37 |
| | | 75 | 83 | 48 |
| | | 37.5 | 71 | 46 |
| | Untreated check | | 100 | 68 |
| | 1,2-dibromo 3-chloropropane | 150 | 78 | 54 |
| | | 75 | 67 | 50 |
| | | 37.5 | 91 | 59 |
| | Untreated check | | 100 | 69 |

In the case of cucumbers, it was noted that there was no adverse effect on the germination or stand of the cucumber seedlings due to the treatment with either nickel sulfate or nickel nitrate. It was also noted that in the cucumber crop, which was harvested daily for market upon maturity, a marked improvement in yield was obtained as compared to crops similarly grown in the same field in previous years without soil treatment against nematodes. This improvement in yield was attributable to the control of the root knot nematode provided in accordance with the invention.

The okra plant is quite susceptible to nematode attack. The crop was planted later in the growing season than the other index crops described hereinbefore at a time when the soil was warmer. Furthermore, a period of three to four months intervened between the time of planting and the observation of the plants for root knot damage at which time the plants were deeply rooted. The particular soil involved develops a type of compact hardpan at a depth of approximately eight inches. The roots of plants penetrate the hardpan but it effectively stops downward migration of the nematocide. It was observed that much of the recorded nematode attack in okra occurred approximately at and below the hardpan level. In this connection, the attack on the plants in the untreated check stands was 100% and very high root-knot indices were determined in these plots. On the other hand, the root knot indices for the check plots treated with the nickel compounds were very materially lower (with only one exception) than for the untreated check plots. The okra plants growing in the soil protected with the nickel compounds flourished and crop yield was subtantially higher than in the unprotected check plots. The nickel compounds exhibited superior protection against nematodes as compared to the commercial nematocides. The root crops of beets and turnips were not harvested until November. Yields of marketable vegetables were very good in the plots protected with nickel and the vegetables were well formed and of high grade. It was observed that the plants growing in the plots protected with the nickel compounds exhibited a very good seedling stand, although okra seedling damage was apparent in the untreated check plots. These observations indicated that there is no tendency toward phytotoxicity on the part of the nickel compounds in the amounts employed in the program.

The method for controlling nematodes made possible in accordance with the invention not only affords substantial savings due to the materially lower cost of nematocide as compared to presently-used materials but also affords substantial savings in the application methods which can be employed. Furthermore, as previously noted, the nematocides contemplated in accordance with the present invention can be applied directly to the soil surface using equipment readily available to the individual farmer and then plowed in when the soil is prepared for planting. The nickel compounds can be mixed with fertilizers, top dressings, etc., and can be applied to the field therewith. In this manner, the only costs involved which would be attributable to the application of the nickel nematocides to the soil would be comparatively insignificant mixing costs. On the other hand, the currently-employed halogenated hydrocarbon nematocides must be applied by means of special, expensive injection equipment and additional substantial costs are accordingly encountered in the application of the currently-employed nematocides.

It will be appreciated that the word "soil" as employed herein is a term of broad application having reference to growth media used for the purpose of nourishing and supporting plant growth.

It is generally considered that one acre of average soil to a cultivatable six-inch depth will weigh about two million pounds. On this basis, one pound of nickel per acre would be approximately 0.5 parts per million. Accordingly, the application of 37.5, 75 and 150 pounds per acre of nickel sulfate hexahydrate represented an addition of approximately 4.2, 8.4 and 16.8 parts per million of nickel per acre, respectively, and in the case of nickel nitrate hexahydrate the addition of 37.5, 75 and 150 pounds per acre represented concentrations of approximately 3.8, 7.6 and 15.2 parts per million of nickel per acre, respectively.

Those skilled in the biological art, particularly in regard to the problem of chemical control of plant diseases, such as those caused by nematodes, will appreciate that the approach to the problem is principally an empirical one. Thus, the degree of rationality which can be applied is low. For example, the work underlying the present invention has demonstrated nematocidal effectiveness for nickel sulfate and nickel nitrate. However, it appears that nickel chloride which might be expected on a rational basis to be equally applicable is, under the same conditions of test, relatively less effective. Thus, when nickel chloride hexahydrate was tested under the conditions set forth in Example I, it was found that inconsistent results were obtained and that, in one instance, 200 p.p.m. of nickel as $NiCl_2 \cdot 6H_2O$ were required to obtain a 98% kill of Panagrellus at the end of seven days. It was also found that, under the conditions set forth in Example II, nickel chloride hexahydrate was much less effective than a commercial halogenated hydrocarbon nematocide and further that a concentration equivalent to 75 pounds per acre was required to provide a reduction in the root-knot index in tomato and that a concentration equivalent to 150 pounds per acre was required to provide a reduction in the root-knot index in beet as compared to untreated check tests.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A method for the control of nematodes which comprises providing in soil a nematocidal amount of a nickel compound from the group consisting of nickel sulfate, nickel borate, nickel cyanide, nickel phosphate, and nickel nitrate.

2. A method for the control of nematodes which comprises introducing into nematode-infested soil a nematocidal amount of nickel sulfate.

3. A method for the control of nematodes which comprises introducing into nematode-infested soil a nematocidal amount of nickel nitrate.

4. A method for the control of nematodes which comprises introducing into nematode-infested soil a nematocidal amount of nickel phosphate.

5. A method for the control of nematodes which comprises introducing into nematode-infested soil a nematocidal amount of nickel borate.

6. A method for the control of nematodes which comprises introducing into nematode-infested soil a nematocidal amount of nickel cyanide.

No references cited.

JULIAN S. LEVITT, *Primary Examiner.*